United States Patent [19]
Schwaller

[11] 3,777,779
[45] Dec. 11, 1973

[54] COMPRESSOR VALVE ASSEMBLY
[76] Inventor: Bernard L. Schwaller, 28 Hedwig Cir., Houston, Tex. 77055
[22] Filed: July 28, 1971
[21] Appl. No.: 166,711

[52] U.S. Cl....... 137/512.3, 137/515.7, 137/516.15, 137/516.21, 285/304, 285/319, 285/DIG. 22
[51] Int. Cl........................................... F16k 15/02
[58] Field of Search................... 285/304, 319, 345, 285/382, DIG. 22, 9 R, 9 M; 137/512.3, 515, 515.5, 515.7, 454.2, 454.4, 454.6; 251/149.6, 149.7

[56] References Cited
UNITED STATES PATENTS

| R25,899 | 11/1965 | Waibel | 137/512.3 X |
|---|---|---|---|
| 1,328,488 | 1/1920 | Bowden | 285/304 X |
| 2,904,065 | 9/1959 | Butlin | 137/454.4 |
| 2,915,325 | 12/1959 | Foster | 251/149.7 |
| 3,106,169 | 10/1963 | Prosser et al. | 137/512.3 X |
| 3,245,703 | 4/1966 | Manly | 285/319 |
| 3,309,013 | 3/1967 | Bauer | 137/512.3 X |
| 3,640,552 | 2/1972 | Demler et al. | 285/319 |

FOREIGN PATENTS OR APPLICATIONS

| 88,254 | 10/1956 | Norway | 137/515.7 |
|---|---|---|---|
| 549,618 | 12/1957 | Canada | 137/454.2 |

Primary Examiner—Robert G. Nilson
Assistant Examiner—Edward Look
Attorney—John F. Lynch et al.

[57] ABSTRACT

A compressor valve assembly according to the present invention may comprise a pair of body sections cooperating to define a suction valve recess and a discharge valve recess having suction and discharge valve elements disposed respectively therein and being operative to control the flow of fluid through suction and discharge passages also formed within the valve structure. The body sections are held in assembly by an assembly ring that closely encircles the body to maintain the same in proper alignment. Detent tabs formed on the assembly ring engage tapered friction support surfaces formed on each of the bodies to frictionally retain the bodies in properly centered assembly.

9 Claims, 11 Drawing Figures

PATENTED DEC 11 1973 3,777,779

Bernard L. Schwaller
INVENTOR

BY

Arnold, White & Durkee
ATTORNEYS

Bernard L. Schwaller
INVENTOR

BY

Arnold, White & Durkee
ATTORNEYS 3,777,779

COMPRESSOR VALVE ASSEMBLY

BACKGROUND OF THE INVENTION

This invention relates generally to compressors for achieving compression of various fluid mediums, such as gasiform fluid, and more particularly to a unitary compressor valve assembly adapted to be received within the compressor head structure of apparatus utilized for a fluid compressing operation.

A manufacturer of compressors is likely to retain a substantial quantity of valves or valve parts on hand to insure against production delays in the manufacturing process. It may be the practice of a manufacturer to maintain a supply of individual compressor parts from which the valves are assembled either prior to or during the compressor manufacturing process. Such manufacturing practice is not generally satisfactory however, because the compressor parts are for the most part small, numerous and delicate thereby requiring the assembly personnel to be relatively highly skilled. Moreover, the delicate and time consuming assembly procedure is likely to detract from the commercial feasibility of the product due to excessive labor costs that may be involved.

In the alternative, it may be a more commercially acceptable practice to purchase and store compressor valves as unitary assemblies which may be installed into appropriate receptacles provided therefor by relatively unskilled assembly personnel.

Preassemblied valve structures of this nature are frequently incapable of disassembly for repair purposes or may be extremely difficult to repair thereby detracting from the otherwise useful aspects of the compressor valve structure.

Compressor valve seats are frequently manufactured as a part of the compressor valve body and are engaged by intricately designed valve structures to control the flow of fluid through the suction and discharge passages formed in the valve body. Such valve seat structure is, of course, extremely expensive in manufacture and requires replacement of major portions of the valve structure in the event the valve seats should become worn to the point that replacement is necessary.

Efficiency of compressor valve structures results in part from the ability of the compressor valve to allow passage of an efficient volume of fluid therethrough. Compressor efficiency is also controlled in part by the amount of re-expansive clearance volume defined by the cooperative relationship of the suction and discharge valves with the compressor piston element. Re-expansive clearance volume, which is frequently referred to as "dead space," is the volume of the space existing between the suction and discharge valves when the piston member is extended to the full length of its compression stroke. If the re-expansive clearance volume is of substantial magnitude, the liquid upon movement of the piston toward the suction strokes thereof, will expand and prevent an efficient volume of fluid from entering past the suction valve. It is necessary therefore to reduce the re-expansive clearance volume or dead space to such extent that it is insignificant to ensure the compression of an optimum amount of fluid by a piston and cylinder of any given size and stroke.

During assembly of the compressor valve to the compressor head structure, it is necessary that the valve parts remain precisely aligned to ensure proper functioning of the valve subsequent to the assembly procedure. Since loose compressor parts ae extremely difficult to maintain in proper alignment during assembly thereof, it is deemed desirable to provide compressor valve structure that is capable of eliminating any problem of valve part misalignment. It is also desirable to insure that any device or structure, provided for maintaining the valve parts in alignment, does not interfere with positioning or operation of the valve parts subsequent to assembly.

It is therefore a primary object of the present invention to provide a novel compressor valve assembly that may be easily retained in storage or may be shipped in preassembled condition and may be installed within a compressor head structure as a unitary assembly.

It is a further object of the present invention to provide a novel compressor valve assembly that may be installed within a compressor structure without necessitating special valve part alignment procedures.

It is an even further object of the present invention to provide a novel compressor valve assembly that may be readily disassembled without aid of tools for repair, cleaning or inspecting purposes.

Among the several objects of the present invention is noted the provision of a novel compressor valve assembly that employs a plurality of suction orifices to insure adequate supply of uncompressed fluid to the valve structure during operation thereof.

It is also an object of the present invention to provide a novel compressor valve assembly that employs a single suction valve structure to control the flow of fluid through a plurality of section passages.

It is another object of the present invention to provide a novel compressor valve assembly that employs suction and discharge valves of simple planar design to facilitate low cost manufacture and efficient operation thereof as well as to provide for low cost repair of the valve and valve seats.

An even further object of the present invention concerns the provision of a novel compressor valve assembly that employs a unique seat plate design eliminating any necessity for expensive manufacturing of seats or seating surfaces within the valve body sections of the valve structure.

It is an even further object of the present invention to provide a novel compressor valve assembly that is simple in nature, reliable in use and low in cost.

Other and further objects, advantages and features of this invention will become apparent to one skilled in the art upon consideration of the written specification taken in conjunction with the annexed drawings. The form of the invention, which will now be described in detail, illustrates the general principles of the invention, but it is to be understood that this detailed description is not to be taken as limiting the scope of the invention. Such description will be referred to by reference characters in the drawings in which.

BRIEF DESCRIPTION OF THE INVENTION

Briefly, the invention concerns the provision of a pair of valve body sections defining at least one valve recess and having suction and discharge passages defined within the valve body structure. At least one valve seat is defined within the valve body and a valve element is biased into engagement with the valve seat to normally close the valve and is movable responsive to fluid pressure differential for allowing the flow of fluid between the suction and discharge passages. At least one of the body sections is provided with a tapered friction support surface that is engaged by friction detent structure capable of maintaining the body sections in frictional assembly. The valve element may be of noncircular configuration and is retained within a generally cylindrical guide passage in such manner that the valve element engages the cylindrical guide surface to maintain alignment of the valve element during operative movement thereof. The valve structure is of simple planar or flat configuration to facilitate low cost manufacture and efficient operation thereof.

DETAILED DESCRIPTION OF PREFERRED EMBODIMENTS

Figure 1:
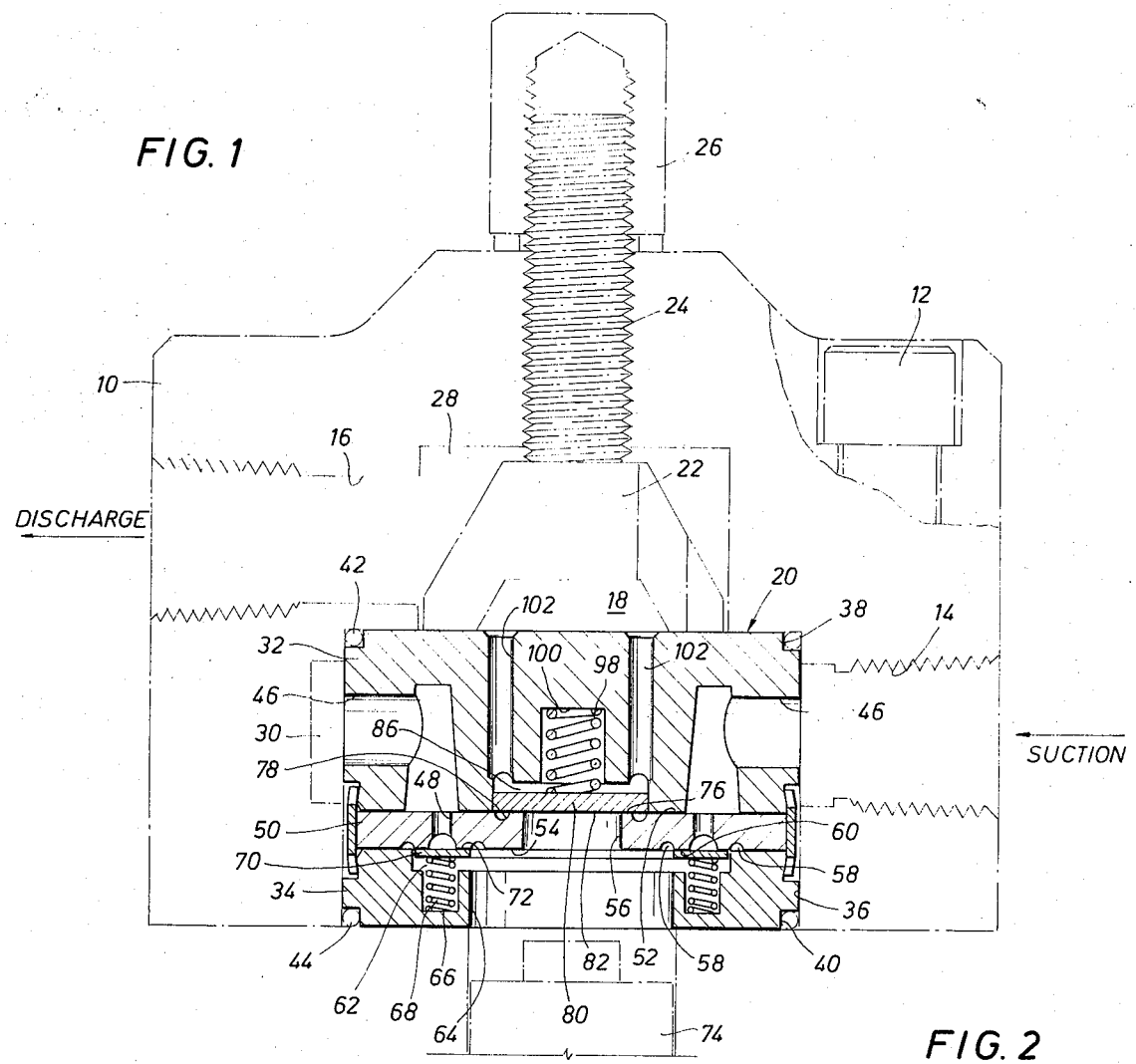
FIG. 1 is a sectional view of a compressor head in broken line having positioned within an appropriate recess formed therein a compressor valve assembly illustrated in full line and being constructed in accordance with the present invention.

Referring now to the drawings for a more detailed understanding of the present invention, and with particular reference to FIG. 1, there is disclosed in broken lines a compressor head 10 that is adapted for connection to a compressor block not shown by a plurality of bolts 12. The compressor head includes an intake or suction passage 14 and a discharge passage 16 disposed in fluid communication with a valve recess 18 adapted to receive a compressor valve assembly illustrated generally at 20. The suction and discharge passage may be internally threaded as illustrated to provide for conducting uncompressed fluid to the compressor valve structure 20 and to conduct compressed fluid from the discharge passage to a source of use thereof.

Proper positioning of the compression valve assembly is maintained by a spacer 22 disposed in engagement with the compressor valve and biased to maintain the valve in secured position by a hold-down screw 24 that is secured in locked position by a hold-down nut 26. The valve recess or chamber 18 is divided by the valve structure 20 into a discharge chamber 28, disposed in communication with the discharge passage 16, and a suction chamber 30, defined between the valve structure and head structure by an annular enlarged portion of the recess 18. The annular chamber 30 extends circumferentially about the valve structure 20 and is disposed in communication with the suction passage 14.

Referring now particularly to the valve assembly structure 20, illustrated in full line in FIG. 1, a means is generally provided to control the flow of fluid as it enters the compressor head structure and exits through appropriate discharge passages. According to the present invention, such means may take the form illustrated in FIG. 1 comprising a first body section 32 and a second body section 34 that fit in relatively close relationship within a generally cylindrical bore 36 defining a portion of the wall structure of the valve recess 18. Annular recesses 38 and 40 are defined in the body sections 32 and 34 respectively to receive sealing members 42 and 44 which may be o-ring type seals, if desired, that establish sealed relation between the valve structure and the internal wall structure of the compressor head.

The first compressor valve body section 32 may be provided with a plurality of suction passages 46 disposed in communication with the annular suction chamber 30 and serving to conduct fluid from the suction chamber to a plurality of valve passages 48 defined in a substantially flat seat disc 50 interposed between the first and second body sections 32 and 34.

The seat disc or plate 50 is substantially flat structure having planar surfaces 52 and 54 disposed in abutment with planar surfaces defined on the first and second body sections 32 and 34. The seat disc 50 also includes a discharge orifice or passage 56 through which pressurized fluid is forced in a manner set forth hereinbelow. Annular grooves are defined within the seat disc 50 about each of the suction passages 48 and about the discharge passage 56 in such manner as to define relatively narrow valve seats 60 about each of the suction passages.

The second body section 34 may be provided with a valve recess 62 extending in substantially concentric relation about a piston bore 64 formed through the second body section. A plurality of spring recesses 66 retain compression springs 68 that bias a substantially circular valve element 70 into seating engagement with the valve seats 60. Valve element 70 is a generally flat structure defining a substantially planar annular sealing surface 72 that is capable of simultaneously sealing all of the suction passages or apertures 48. Valve 70 is opened responsive to pressure differential created as piston member, shown in broken lines at 74, is moved downwardly during the suction stroke thereof.

A single discharge valve seat 76 is defined by an annular groove 78 concentrically about the discharge passage 56 in the seat disc and is engaged by a discharge valve element 80 to control the flow of fluid through the discharge passage structure of the valve.

Figure 7:
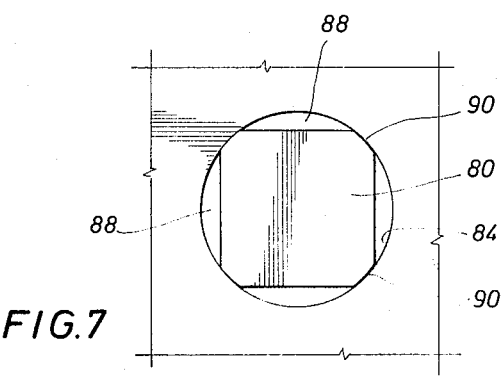
FIG. 7 is a fragmentary bottom view of the upper valve housing of FIG. 1 illustrating the discharge valve and its relation with the discharge valve recess.

The discharge valve element 80, according to the present invention, may take the form of a substantially flat structure of noncircular configuration that is received within a valve recess in such manner that fluid flowing past the discharge valve seat 76, flows in evenly distributed manner past the discharge valve element toward the discharge passages of the valve assembly. The discharge valve of the present invention, accordingly, may take the form illustrated in FIG. 1 where it is set forth as a substantially flat plate defining a substantially planar sealing surface 82 that engages the seating surface 76 in the closed position of the valve to block the flow of fluid from discharge passage 56. Valve element 80 may be of generally square configuration, as illustrated in FIG. 7, cooperating with the cylindrical wall structure 84 of discharge valve recess 86 to define a plurality of flow passages 88 past the discharge valve structure. Valve 80 may also be provided with a plurality of arcuate guide surfaces 90 disposed in guiding relation with the cylindrical wall 84 to maintain proper alignment of the valve element with the discharge valve seat 76 as the valve moves between the open and closed positions thereof.

Figure 8:
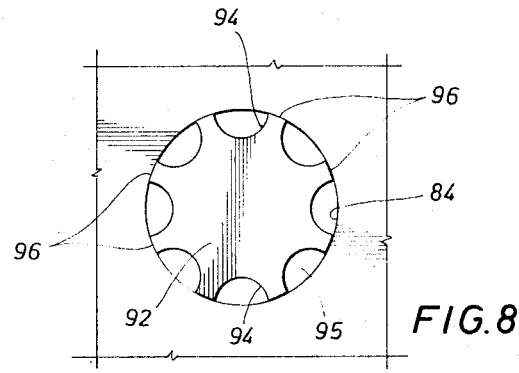
FIG. 8 is a fragmentary bottom view of an upper valve housing illustrating the discharge valve recess and showing the relationship of a modified discharge valve structure disposed therein.

A further embodiment of the discharge valve structure is illustrated at 92 in FIG. 8 comprising an essentially circular disc provided with a plurality of recesses 94 that cooperate with the cylindrical wall structure 84 of the valve recess 86 to define a plurality of discharge passages past the discharge valve structure. Arcuate surfaces 96 engage the cylindrical surface 84 to provide a similar valve guiding relationship as discussed above regarding FIG. 7. It is intended that other discharge valve structures may be employed in place of the discharge valves illustrated in FIGS. 7 and 8 without departing from the spirit or scope of the present invention and therefore it is intended that the present invention not be limited to the specific discharge valve structures illustrated and described.

Discharge valve element 80 or 92 may be urged into seating engagement with the seat surface 76 by a compression spring member 98 retained within a centrally located spring recess 100 appropriately defined within the first body structure 32. As the piston element 74 is moved upwardly toward discharge valve 80, during the compression or discharge stroke thereof, the discharge valve 80 will be moved from its closed position to an open position by pressure differential across the valve element which urges the valve element against the bias of spring 98 thereby opening the valve and allowing compressed fluid to flow past the valve structure through a plurality of discharge passages 102, communicating the discharge valve recess 86 with discharge valve chamber 28.

It is seen, therefore, that the piston member 74, upon moving downwardly during the suction stroke thereof, will induce the flow of unpressurized fluid from the suction passage 14 of the compressor head and through suction passages 46 and suction valve orifices 48 past the suction valve member 70 as it is forced toward the open position thereof by pressure differential against the bias of compression spring 68.

During the suction stroke, the discharge valve element will be biased to its closed position by spring 98 thereby serving as a check valve to present the flow of pressurized fluid from the discharge passages 102 through discharge valve orifice 56. As the piston member 74 is reversed and moved upwardly during the compression or discharge stroke thereof, the suction valve 70 reverses its function and essentially becomes a check valve biased to its closed position by compression spring 68. Compression of the fluid within the cylinder immediately above the piston acts upon the valve element 70, due to pressure differential thereacross, thereby enhancing the sealing ability of the suction valve. Simultaneously, discharge valve 80 is moved from its seat 76 by pressurized fluid against the bias of compression spring 98 thereby causing the flow of pressurized fluid past the discharge valve and into discharge passages 102. The flow passages 88 and 95 in FIGS. 7 and 8, respectively, serve to evenly distribute the flow of pressurized fluid past the discharge valve to ensure efficient operation of the compressor valve system.

For the purpose of eliminating substantially all of the "dead space," within the valve structure, (the volume of space existing between the compressor piston and the suction and discharge valves of the compressor valve assembly when the piston is extended to the limit of its compression stroke) to prevent reexpansion of compressed fluid and thereby promote efficient operation of the compressor, the lower body section 34 and seat plate 50 may be cooperatively configured to allow close fitting relation thereof with the piston 74. Moreover, the circular suction valve and the generally flat discharge valve 80 may also be structured to allow the piston to fit closely therewith as illustrated in FIG. 1 to limit "dead space" to an extremely small volume which, upon reexpansion as the piston moves downwardly during the suction stroke thereof, will not prevent a substantial volume of uncompressed fluid from being drawn into the valve for compression during the next compression stroke. The inner periphery of the suction valve 70 is illustrated in FIG. 1 as being of sufficient dimension to allow the outer periphery of the piston 74 to pass therethrough, thereby allowing the piston to move into juxtaposition with the planar surface 54 of seat plate 50 and the discharge passage or aperture 56 formed in seat plate 50 is of sufficient dimension to allow passage of the outer reduced diameter portion of the piston, thereby allowing the planar extremity of piston 74 to move into juxtaposition with the lower planar surface 82 of the discharge valve 80. Cooperative related structures of the piston and valve, coupled with the simple design of the suction and discharge valves, is effective to produce compressor efficiency not ordinarily attainable.

To facilitate storage, shipping, handling and installation of the compressor valve assembly illustrated in FIG. 1, it is desirable to provide some means for retaining the compressor valve structure in assembled condition to prevent loss or misorientation of any of the numerous delicate parts thereof. With the compressor valve structure forming a unitary assembly, the installation procedure by the manufacturer of the compressor involves simply the insertion of a compressor valve assembly into an appropriate recess provided therefor in a compressor head structure and securing the valve assembly after the same has been properly positioned within the compressor head. Where assembled valve units are employed, it is necessary that the means for securing the compressor valve parts into assembly be capable of accomplishing its assembly feature without interfering in any way with operation of the compressor valve after the same has been properly secured within the compressor head structure. Moreover, it is desirable that the means for connecting the compressor parts into unitary assembly be capable of disassembly for inspection, cleaning or repair operations without necessitating the use of special tools or procedures for disassembly thereof.

Figure 3:
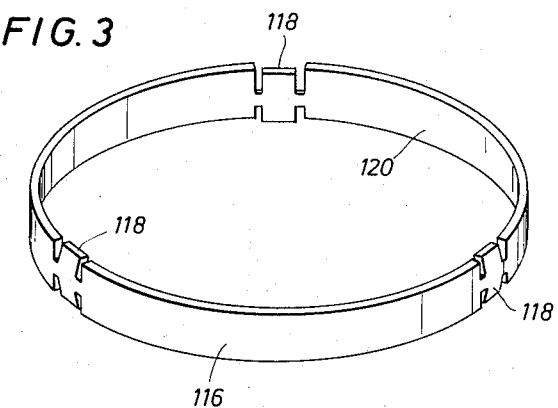
FIG. 3 is an isometric view of an assembly ring constructed in accordance with the present invention.
Figure 2:
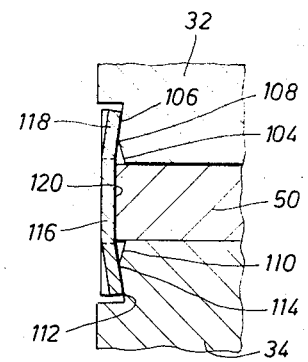
FIG. 2 is a fragmentary sectional view of the compressor valve structure of FIG. 1 illustrating retention of compressor parts in assembly by an assembly ring.
Figure 4:
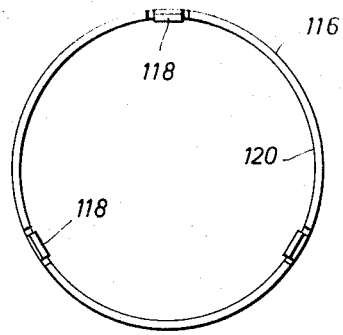
FIG. 4 is a plan view of the assembly ring structure of FIG. 3.

According to the present invention, a connection structure may take the form of an assembly ring, shown in FIG. 1 and illustrated in greater detail in FIGS. 2 and 3, which assembly ring is capable of retaining the compressor valve parts in assembly by frictional means. The first body section 32 is provided with a tapered lead or cam surface 104 and an oppositely tapered annular frictional support surface 106 that cooperates to define an annular ridge 108 extending about the lowermost portion of the first body section 32. The cam surface 104 and frictional support surface 106 may, if desired, be of frusto-conical configuration, as illustrated, or if desirable, may take any other suitable form capable of achieving a desirable result. The uppermost portion of the lower or second body section 34 may be provided with a tapered lead or cam surface 110 and an oppositely tapered frictional support surface 112 cooperating to define an annular ridge 114 that forms the external periphery of the upper portion of the second body section. While the ridges 108 and 114 are illustrated and otherwise characterized as being of annular configuration, it should be obvious to one skilled in the art, that other surface configurations might be employed within the spirit and scope of the present invention with equally satisfactory results.

An assembly ring 116 illustrated in detail in FIGS. 2 and 3, that may be of annular configuration, may include a plurality of inwardly extending frictional assembly tabs extending inwardly beyond the inner peripheral surface defined by the assembly ring structure. The inner peripheral surface 120 of the assembly ring 116, when in assembled condition may be disposed in close fitting relation with the seat plate or disc 50 and serves to maintain the seat plate in properly oriented position relative to the upper and lower body sections 32 and 34.

The friction assembly tabs 118 are capable of being sprung outwardly by the cam or lead surface 104 or 110 of the body sections structure in order to clear the respective annular ridges 108 or 114, as the case may be. After the parts have moved together during assembly sufficiently to cause the tabs to clear the annular ridge, the tabs will spring back substantially to the original configuration thereof and will be disposed in frictional engagement with the appropriate frictional support surface 106 or 112. After the assembly ring structure 116 has been "snapped" into securing relation with each of the body sections 32 and 34, the body sections and the seat disc or plate 50 will be maintained in unitary assembly and in properly aligned relation to facilitate simple and easy insertion of the compressor valve assembly into a compressor head structure.

In the event it should subsequently become desirable to disassemble the compressor valve assembly, it is simply necessary to apply sufficient force to a valve body section to cause springing of the associated friction assembly tabs to a position allowing clearance of the tabs past the annular ridge structure. This can generally be accomplished readily without tools of any kind. After a cleaning, inspection or repair operation, the body section and assembly ring can be reassembled simply by pressing the same together to cause springing of the friction assembly tabs 118 over the annular ridge in the manner discussed above.

Figure 5:
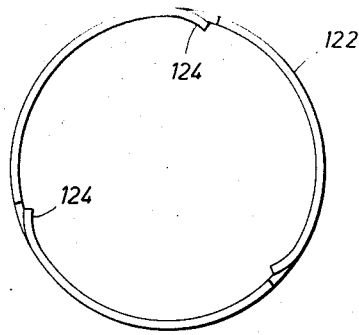
FIG. 5 is a plan view of an assembly ring structure defining a modified embodiment of the present invention.
Figure 6:
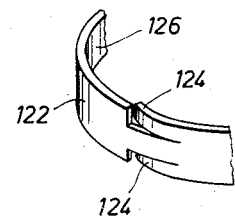
FIG. 6 is a fragmentary isometric view of the assembly ring structure of FIG. 5.

Referring now to FIG. 5, there is disclosed a modified embodiment of the assembly ring structure at 122 that includes a plurality of inwardly extending detents 124 defined by slitting the assembly ring structure in the manner illustrated to define elongated tabs and bending the small tabs into a curvature of smaller radius than the original radius of the assembly ring structure. The upper and lower detents 124 effectively cooperate to maintain the first and second body sections in properly aligned relation and the inner peripheral surface 126 of the assembly ring properly orients the seat plate with respect to both the upper and lower body sections.

Figure 10:
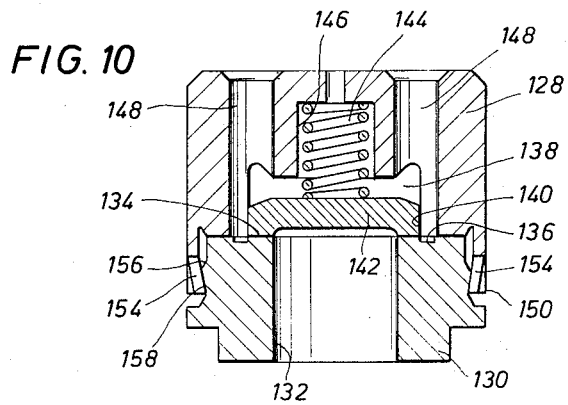
FIG. 10 is a sectional view of the compressor valve structure of FIG. 9 taken along line 10—10.
Figure 11:
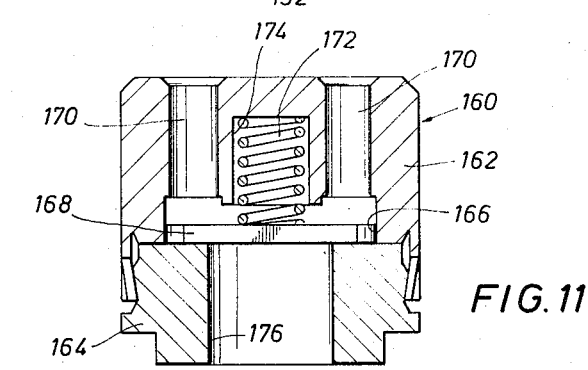
FIG. 11 is a sectional view of a further modified compressor valve structure constructed in accordance with the theory of the instant invention.
Figure 9:
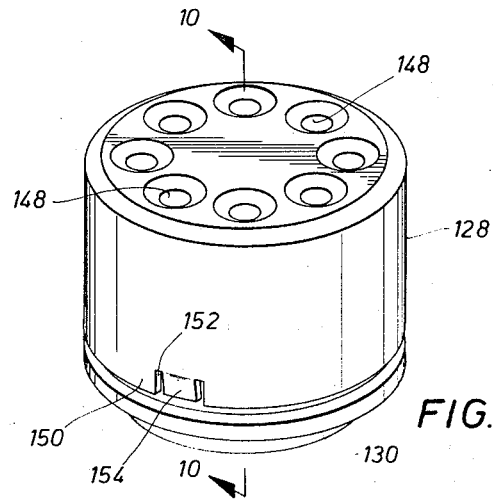
FIG. 9 is an isometric view of a modified compressor valve structure constructed in accordance with the present invention.

Referring now to FIGS. 9-11, a modified embodiment of the present invention is illustrated which may include an upper body section 128 and a lower body section 130 that interfit to define a compressor valve housing. The lower or second body section 130 may be provided with a flow passage 132 extending therethrough to allow the flow of compressed fluid upwardly past an annular valve seat defined by an annular groove 136 formed in the upper substantially planar surface thereof. The first or upper body section 128 may be provided with a valve recess 138 having a substantially cylindrical wall 140 defining a guide surface for a valve element 142, movably received within the valve recess. A compression spring member 144 may be retained within a spring recess 146 to bias the valve element 142 into sealed relation with the valve seat 134. A plurality of discharge passages 148 may be formed in the first body section 128 in such manner as to intersect the cylindrical surface 140 and thereby define a plurality of flow passages past the exterior periphery of the valve element 142. Accordingly, it is observed that the valve element may be of substantially cylindrical configuration to provide for accurate guiding relation with surface 140 and yet the fluid being forced past the valve 142 will find ample passage structure for even distribution thereof in the discharge passages 148.

As discussed above regarding FIGS. 1, 2 and 3, the first and second body sections may be connected into unitary assembly for shipping, handling, storage and the like. A means may be provided for frictionally retaining the first and second body sections in unitary assembly which means may, according to the present invention, take the form illustrated in FIGS. 9 and 10 where the upper body section 128 is shown to be provided with a depending annular peripherical skirt 150 having a plurality of cuts 152 formed therein that cooperate to define a plurality of friction assembly tabs or detents 154. The detents 154 extend inwardly beyond the inner peripherical surface defined by the skirt 150. The lower body section 130 may be provided with a tapered cam surface 156 which cooperates with an oppositely tapered frictional support surface 158 to define an annular ridge about the lower body section in similar manner as discussed above regarding FIGS. 1 and 2. Tapered surfaces 156 and 158 may take the form of frusto-conical surfaces as illustrated in the drawings or in the alternative may be of any other desirable configuration.

The inwardly extending friction assembly tabs 154 upon assembly of the first and second body sections will be cammed outwardly allowing the tabs to clear the ridge defined by the cooperating frusto-conical surfaces. As the first and second body sections are moved into abutment, the tabs 154 will spring back to the FIG. 10 position thereof, thereby firmly engaging the frusto-conical friction support surface 158 to retain the first and second body portions in frictional assembly. In the event it is desired to separate the first and second body portions for inspection, cleaning or repair of the valve structure 142, it is simply necessary to apply opposing forces to the body sections which may, if desired, be accomplished by hand to cause the flexible tabs 154 to be cammed outwardly as the body sections are separated sufficiently to clear the annular ridge defined by the cooperating frusto-conical surfaces. Reassembly of the valve structure is accomplished simply by moving body sections 128 and 130 together with sufficient force to cause the spring tabs 154 to be cammed outwardly clearing the annular ridge and snapping into frictional seating assembly with the frusto-conical friction support surface 158.

A further modified embodiment of the invention, as illustrated in FIG. 11, comprises a valve structure, illustrated generally at 160, including upper and lower body sections 162 and 164 that are retained in frictional assembly in similar manner as discussed above regarding FIGS. 9 and 10.

Upper body section 162 may be provided with a generally cylindrical valve recess 166 capable of receiving a substantially flat valve element 168 in movable relation therein. Valve element 168 may be provided with a plurality of recesses, essentially as illustrated at 94 in FIG. 8, or in the alternative may be essentially rectangular with appropriate bearing surfaces as illustrated at 80 in FIG. 7, within the spirit and scope of the present invention. The outer surfaces of valve element 168 cooperate with the cylindrical surface 166 to provide proper guiding and bearing relation therebetween to maintain the valve in properly aligned relation within the recess, as discussed above regarding FIGS. 7 and 8. The noncircular relation of valve 168 to the cylindrical surface 166 cooperatively defines a plurality of flow passages to conduct fluid past the valve structure to a plurality of discharge passages 170 formed in the first body section in communication with recess 166. For the purpose of maintaining valve 168 in normally closed condition during the suction stroke of an associated piston, a compression spring 172 may be retained within an appropriate spring recess 174. As the piston moves upwardly during its compression stroke, fluid will flow through passage 176 bearing upon the normally closed valve element 168 and, when the pressure differential acting upon the valve element is sufficient to overcome the bias of spring 172, the valve will open thereby allowing the flow of fluid past the valve structure to discharge passages 170.

Compressor valve structure 160 is capable of assembly and disassembly utilizing similar procedure as discussed above regarding the structure illustrated in FIGS. 9 and 10.

In view of the foregoing, it is apparent that I have provided a novel pressure valve structure that eliminates the problems of misplaced or misorientated parts that may otherwise occur when parts are shipped or handled in loose condition and subsequently installed part by part into a compressor head structure. The unique assembly structure of the present invention facilitates handling and shipment of my pressure valve structure in preassembled condition and also facilitates ready insertion of the preassembled compressor valve assembly into a compressor head without requiring special attention for maintaining proper alignment of the various parts. The unique assembly features of the compressor valve of this invention is effective to allow assembly or disassembly of the compressor valve structure without the use of special tools so that the valve structure may be inspected, cleaned, or repaired very easily in the event such should become desirable.

My invention further accomplishes adequate supply of uncompressed fluid to the valve structure during operation thereof and also provides for optimum fluid distribution as the fluid is compressed and forced to flow to discharge passages in the valve device and these features obviously enhance the efficiency of valves constructed in accordance with the present invention. Efficiency of the valve structure is also enhanced by allowing a single suction valve structure to control the flow of fluid through a plurality of suction passages.

Commercial aspects of the present invention are enhanced by an extremely simple and novel construction employing substantially planar suction and discharge valve structures that cooperate with simple, planar valve seat structures to control the flow of fluid through the valve. In view of the foregoing, it is apparent that the present invention is one well adapted to attain all of the objects hereinabove set forth together with other advantages which will become obvious and inherent from the description of the apparatus itself.

It will be understood that certain combinations and subcombinations are of utility and may be employed without reference to other features and subcombinations within the scope of this application. As many possible embodiments may be made of the invention without departing from the spirit or scope thereof, it is to be understood that all matters, herein set forth or as shown in the accompanying drawings, are to be interpreted as illustrative and not in a limiting sense.

Having thus fully described the subject matter which I consider to be my invention, I now claim:

1. A compressor valve assembly comprising:
   a first body section having a discharge valve recess formed therein and having means defining suction and discharge passages;
   a discharge valve element disposed in said discharge valve recess;
   a second body section having a suction valve recess formed therein;
   a suction valve element disposed within said suction valve recess;
   seat plate means disposed between and in engagement with said first and second body sections, said seat plate means having both discharge and suction passage means formed therein and being in communication, respectively, with said suction and discharge passages of said first body section and with said suction valve recess, said seat plate means defining suction and discharge valve seat means about said suction and discharge passage means, said suction valve element engaging said suction valve seat means and controlling the flow of fluid through said suction passage means, said discharge valve element engaging said discharge valve seat means and controlling the flow of fluid through said discharge passage means;
   friction support surface means defined on said first body section;
   friction support surface means formed on said second body; and
   retainer means disposed in engagement with both of said friction support surface means and frictionally retaining said first and second body sections and said seat plate means in assembly.

2. A compressor valve assembly as recited in claim 1:
   said friction support surface means of each of said first and second body sections being of frusto-conical configuration and being oppositely tapered with respect to the other of said friction support surface means, said friction support surface means defining annular ridges about each of said body sections;

said retainer means engaging said friction support surface means upon assembly of said body sections and being movable by said friction support surface means to allow said retainer means to clear said annular ridges; and said retainer means, after clearing said ridges, moving into frictional engagement with said friction support surface means.

3. A compressor valve assembly as recited in claim 1:

said suction passage means comprising a plurality of suction apertures formed in said seat plate means;

said suction valve seat means comprising a plurality of valve seats defined one about each of said suction apertures;

said suction valve element being of substantially flat configuration and being capable of simultaneously controlling the flow of fluid through said suction apertures; and means biasing said suction valve element into engagement with said seat plate means to maintain said suction aperture normally closed.

4. A compressor valve assembly as recited in claim 1:

said discharge passage means being a single passage formed substantially centrally of said seat plate means;

said discharge valve seat means being defined about said discharge passage means;

said discharge valve recess being of substantially circular configuration and defining a generally cylindrical guide surface;

said discharge valve element being of generally planar non-circular configuration and having a plurality of peripheral surfaces disposed in engagement with said guide surface to maintain proper alignment of said discharge valve element during movement thereof; and means normally biasing said discharge valve element into engagement with said seat plate means.

5. A compressor valve assembly as recited in claim 1 said suction passage means comprising a plurality of suction apertures formed in said seat plate means;

said suction valve seat means comprising a plurality of valve seats defined one about each of said suction apertures;

said suction valve element being of substantially flat configuration and being capable of simultaneously controlling the flow of fluid through said suction apertures;

means biasing said suction valve element into engagement with said seat plate means to maintain said suction apertures normally closed;

said discharge passage means being a single passage formed substantially centrally of said seat plate means;

said discharge valve seat means being defined about said discharge passage means;

said discharge valve recess being of substantially circular configuration and defining a generally cylindrical guide surface;

said discharge valve element being of generally flat non-circular configuration and having a plurality of peripheral surfaces disposed for guiding engagement with said guide surface to maintain proper alignment of said discharge valve element during movement thereof, said discharge valve element cooperating with said guide surface to define a plurality of flow passages to allow the flow of fluid past said discharge valve element;

means normally biasing said discharge valve element into engagement with said seat plate means.

6. A compressor valve assembly as recited in claim 1:

said seat plate means being of substantially flat configuration and having substantially planar surfaces defined on each side thereof;

said discharge passage means comprising a single passage formed generally centrally of said seat plate means; and said suction passage means comprising a plurality of passages being substantially evenly distributed in annular pattern about said single discharge passage.

7. A compressor valve assembly as recited in claim 6:

said suction seat means being defined on one side of said seat plate means and said discharge seat means being defined on the opposite side of said seat plate means.

8. A compressor valve assembly as recited in claim 1:

said retainer means comprising an annular ring disposed about said friction support surface means of both body sections;

movable detent means being carried by said annular ring and frictionally engaging said friction support surface means; and said annular ring being disposed in close fitting relation with said seat plate means and retaining said seat plate means in aligned relation with said first and second body sections.

9. A compressor valve assembly as recited in claim 8:

said detent means comprising a plurality of detents capable of being urged radially outwardly during assembly of said body sections and being capable of moving into frictional engagement with said friction support surface means upon completion of the assembly movement.

* * * * *